United States Patent
Oates

[15] 3,665,835
[45] May 30, 1972

[54] FLUID TYPE ROTARY ACTUATOR

[72] Inventor: Charles E. Oates, Los Angeles, Calif.

[73] Assignee: Northrop Corporation, Beverly Hills, Calif.

[22] Filed: Aug. 14, 1969

[21] Appl. No.: 850,270

[52] U.S. Cl. .................................. 92/121, 92/122, 92/165
[51] Int. Cl. ........................................................ F01c 9/00
[58] Field of Search ........................... 92/121, 122, 165, 161

[56] References Cited

UNITED STATES PATENTS

| | | | |
|---|---|---|---|
| 3,393,610 | 7/1968 | Aarvold | 308/36.1 X |
| 3,023,741 | 3/1962 | O'Connor | 92/122 |
| 3,153,373 | 10/1964 | Gies et al. | 92/161 X |
| 3,155,019 | 11/1964 | Stiglic et al. | 92/122 X |
| 3,207,047 | 9/1965 | O'Connor | 92/124 |

*Primary Examiner*—Martin P. Schwadron
*Assistant Examiner*—Allen M. Ostrager
*Attorney*—Harold L. Fox and Willard M. Graham

[57] ABSTRACT

A fluid-type rotary actuator usable in installations where weight and space are prime considerations. The actuator having packing gland assemblies secured to and rotating with the output shaft of the actuator thereby eliminating stepped construction of the wall defining the actuator's chamber thus insuring the fluid pressure acting to impart rotation to the actuator will be applied at a location resulting in maximum torque. The actuator also includes a floating feature resulting in isolation of substantially all radial loads acting on the actuator.

3 Claims, 4 Drawing Figures

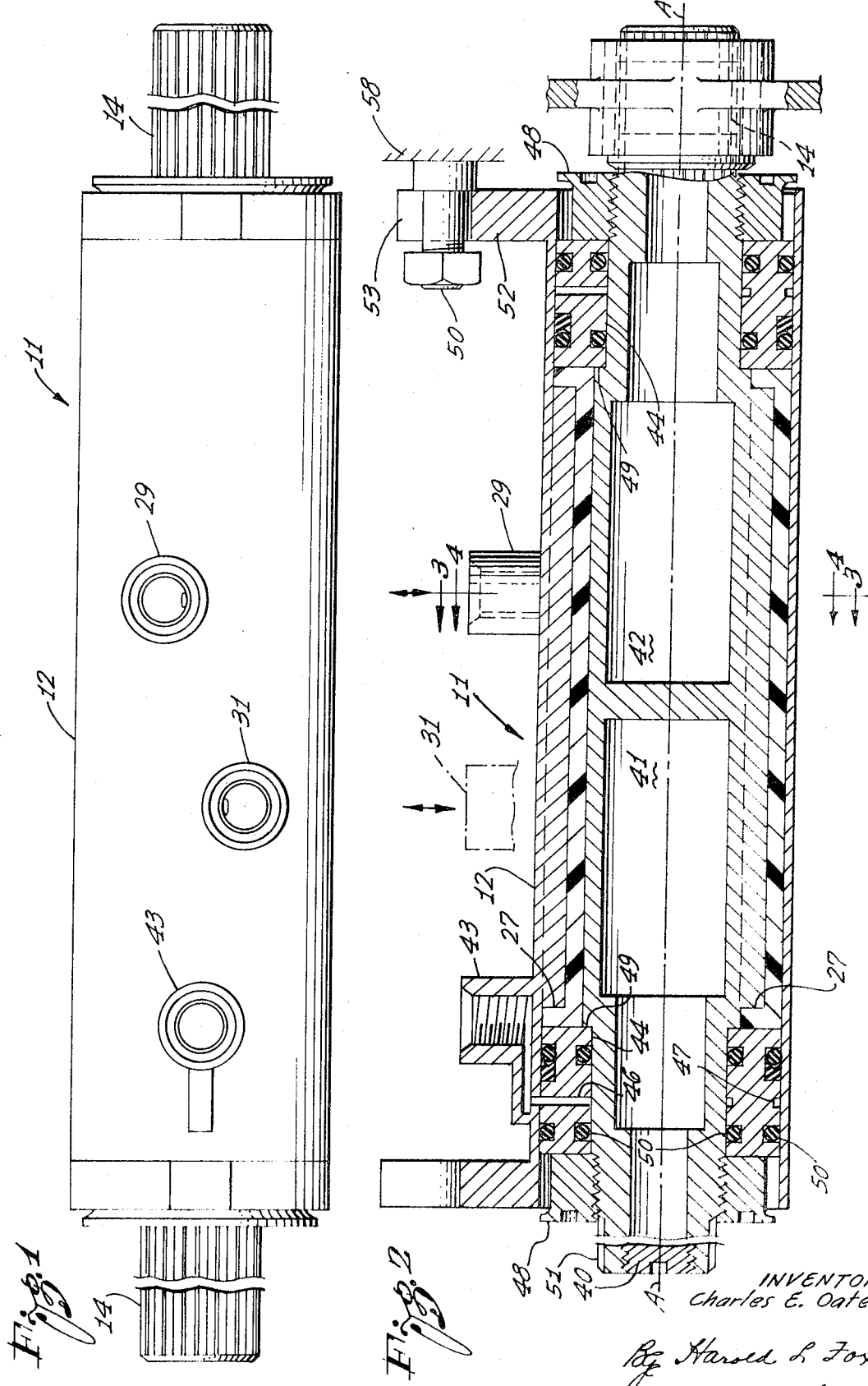

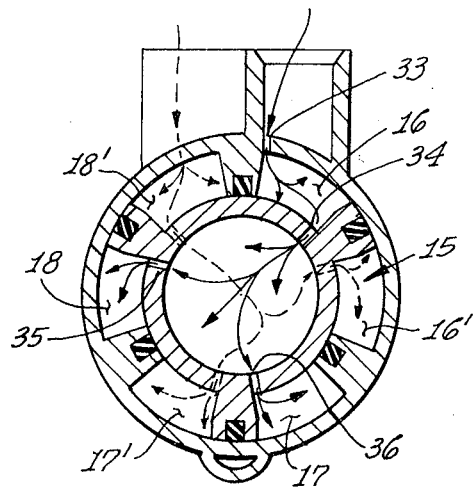
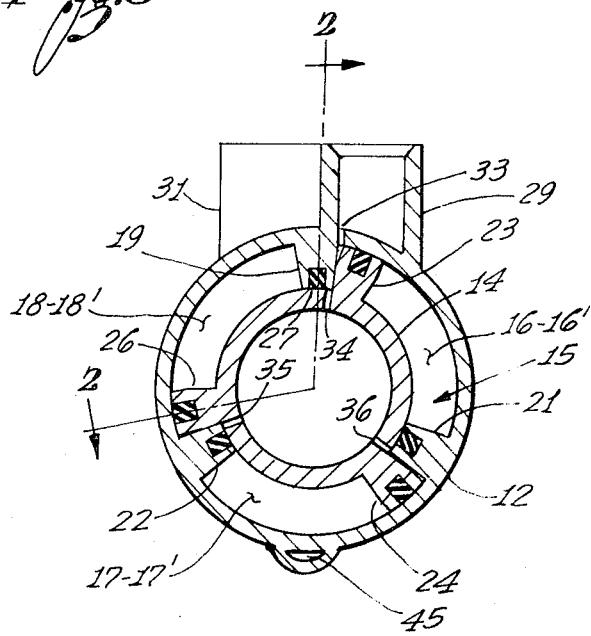

FLUID TYPE ROTARY ACTUATOR

This invention relates to fluid actuators and more particularly to fluid-type rotary actuators. Rotary actuators are well known and utilized extensively in aircraft, missiles and like vehicles where space and weight requirements are prime considerations.

Construction of the present actuator inherently provides numerous advantages over rotary actuators presently available. Briefly the present actuator constitutes a housing defining an operating chamber of cylindrical configuration the inner wall of which constitutes a true and clean cylindrical surface throughout its extent. That is the inner surface of the chamber wall is free of "stepped" construction, annular shoulders, projections etc., normally utilized to retain annular gland assemblies, ring nuts etc. in the actuators, rather members referred to above are secured to and rotate with the output shaft of the actuator. The actuator also includes structure enabling the actuator's housing to "float" or operate in a number of unrestrained positions. The two features referred to above cooperate to reduce wear of seals, gland assemblies etc. carried by the output shaft due to eccentricities which may be present between these members and the space in which they are required to operate. Also the above construction enables the actuator to deliver maximum torque per unit of length of the actuator. Also this type of construction permits maximum angular travel for a given number of vanes and control of dimensions of seals etc. Thus a rotary actuator constructed in the manner described above reduces wear on the seals, gland assemblies, increases life of the actuator generally and provides maximum torque per unit of weight in a manner that will become apparent as the disclosure progresses.

An object of the present invention is to disclose a fluid actuator providing relatively large torque per inch for a given outside diameter.

Another object is to provide a rotary actuator in which excess friction of the packing gland assemblies, seals, etc. is reduced to a minimum thereby prolonging their life and the life of the actuator.

Another object is to provide a rotary actuator that is efficient in operation, economical to manufacture and free of malfunctioning tendencies.

Although the characteristic features of the present invention are particularly pointed out in the appended claims, the invention itself, also the manner in which it may be carried out, will be better understood by referring to the following description taken in connection with the accompanying drawings forming a part of this application and in which:

FIG. 1 is a plan view of the actuator disclosed herein.

FIG. 2 is a sectional view as indicated by the line 2—2 of FIG. 3.

FIGS. 3 and 4 are sectional views as indicated by the lines 3—3 and 4—4, respectively, of FIG. 2, FIGS. 3 and 4 are similar except the output shaft has been rotated through 50 percent of its stroke in the latter figure.

Referring to the drawings, a preferred embodiment of a fluid actuator 11 of the type disclosed herein is shown. Major components of the actuator 11 include a housing and output-shaft 12 and 14, respectively.

The housing 12 defines a chamber 15 of cylindrical configuration having a longitudinal axis A—A as shown in FIG. 2. In the present embodiment the chamber 15 constitutes a composite chamber divided into six individual chambers 16—16', 17—17' and 18—18' by components of the housing 12 and shaft 14 as best seen in FIG. 3 and as presently explained.

The shaft 14 is also of hollow cylindrical configuration. As assembled, the shaft 14 is received in the chamber 15 with the axis thereof coinciding with the axis A—A of the housing 12 and with its ends extending beyond the ends of the housing.

In the present embodiment, the housing 12 includes three radially extending longitudinal abutment members 19, 21 and 22, these members have a fixed relation with respect to the housing 12 or constitute integral portions thereof. As assembled, the inner surface of the members 19, 21 and 22 contact (bear on) the outer surface of the shaft 14. Also the shaft 14 has three radially extending longitudinal vanes or blades 23, 24 and 26 formed thereon also of integral construction therewith. The outer surfaces of the vanes 23, 24 and 26 contact (bear on) the surface of the wall defining the chamber 15. The members 19, 21 and 22 are hereafter referred to as abutment members while the vanes 23, 24 and 26 are referred to as rotor vanes. It will now be seen how the abutment members and the rotor vanes cooperate to define the individual expansible chambers 16—16', 17—17' and 18—18' as best seen in FIG. 4.

The abutment members and rotor vanes, referred to above, carry conventional fluid seals 27 in the outer ends thereof functioning to prevent fluid leakage between the individual chambers and from one set of individual chambers to another. In this respect it will be understood that any number of abutment members and rotor vanes desired may be provided, three sets being shown in FIGS. 3 and 4 merely for purposes of illustration.

Referring further to FIG. 2, it will be seen that the inside wall of the chamber 15 defines a true, smooth, open-ended cylindrical surface of substantially constant diameter from end to end with the exception of the members 19, 21 and 22. That is the surface defining the chamber 15 is free of stepped construction or projections, rather stepped construction is provided in the shaft 14. Thus packing gland assemblies 44 are retained between the annular shoulders 49 and ring nut members 48, the latter being threadably secured to the shaft 14. The assemblies 44 include sealing rings 50 functioning in a conventional manner to prevent fluid leakage from the actuator 11.

Thus it will be seen that the assemblies 44 are secured to and rotate with the shaft 14 permitting the chamber 15 and the outside measurement of the actuator 11 to be a maximum controlled by the space available. In similar actuators of this type, the wall of the operating chamber is of stepped construction necessarily increasing the thickness thereof. The thickness of the cylinder wall of the actuator disclosed herein is controlled only by the pressure of fluid present in the actuator 11. Accordingly, it will be apparent that the overall dimension of the actuator 11 will be dictated, on the most part, by available space in which the actuator 11 is to operate. Referring further to FIGS. 3 and 4 it will be seen that the diameter of the shaft 14 exceeds 50 percent of the major diameter of the chamber 15, i.e. Thus it will be apparent that construction of this type permits pressurized fluid to be applied (radially) outward a maximum distance with respect to the axis A—A.

Referring to FIGs. 1, 2, 3 and 4, operating fluid enters and leaves the actuator 11 via ports 29 and 31 constructed integral with the housing 12. Fluid leaking from the actuator 11 is collected and returned to the fluid system via a return port 43 also constructed integral with the housing 12.

Referring further to FIG. 3, it will be apparent the shaft 14 can rotate in a clockwise direction only with components of the actuator 11 arranged as shown in this figure. Under conditions represented in FIG. 3, pressurized fluid flowing through the actuator is provided by passageways 33–36, inclusive, provided in the housing 12 and shaft 14. Pressured fluid enters the housing 12 through the port 29, passes through the passageway 33 and enters the individual chambers 16, 17 and 18. Pressurized fluid entering the individual chambers 16, 17 and 18 imparts clockwise rotation to the shaft 14. The path of pressurized fluid, imparting clockwise rotation to the shaft 14, is indicated by the solid line in FIG. 4. At such time as the actuator's shaft 14 is returned to its original position, that is counter-clockwise rotation imparted thereto, the path of pressurized fluid through the actuator is indicated by the dotted line in FIG. 4. Further explanation in this respect is not believed necessary as the operation of rotary actuators and the path of fluid therethrough is well known to those skilled in the art.

Chambers 41 and 42, provided in the shaft 14, function as distribution chambers for fluid as it is directed to and returns from the individual chambers, plugs or seals 40 are provided at each end of the shaft 14 rendering the chambers 41 and 42 fluid tight. Fluid, which may leak or escape from or past the several chambers of the actuator 11, is collected in the passageway 45 and is returned to the fluid system via the passageway 45 to the port 43. In collecting fluid referred to above, annular and radial passageways 46 and 47, respectively, are provided in the assemblies 44.

In this respect it will be apparent that the diameters of the chambers 41 and 42, accordingly the outside diameter of the shaft 14 is fairly large as compared to the diameter of chamber 15. Thus the side surfaces of the members 19, 21 and 22 and rotary vanes will be located a maximum radial distance from the axis A—A, that is the force provided by pressurized fluid will be applied at a maximum radial distance or at a optimum location. Accordingly the overall length (outside dimension) of the housing 12 will be minimal and the actuator 11 will provide maximum torque per inch for a given outside diameter of the actuator 11.

The housing 12 carries lug members 52 at each end thereof the configuration of which is best seen in FIG. 2. The members 52 being of integral construction or fixedly secured to the housing 12. The outer end portions of the members 52 have radial slots 53 formed therein thereby providing a bifurcation adapted to receive a pin, bolt or like structure 50 therein secured to fixed structure. In this respect it will be understood that a pin, bolt or like structure 50 is also received in the bifurcation 53 in the left end of the actuator 11 as shown in FIG. 2. The bifurcations cooperating with the pin, bolt or like structure enables the actuator housing 12 to "float" or move to various locations with respect to the shaft 14, for example; horizontally, vertically etc.

Serrations 51 are provided in the ends of the shaft 14 enabling torque provided by the actuator 11 to be transmitted to a shaft or the like (not shown). The ends of the output shaft carries conventional bearing means securing the shaft 14 to fixed structure.

The floating feature of the actuator's housing 12 adds life to the packing gland assemblies 44 and seals contained therein, also to the seals 27 carried by the abutment members and rotary vanes. The pins 50 operating in the bifurcations 53 allow the actuator housing 12 to function in a floating manner, that is movement of the housing 12 is not restricated as is the case in conventional actuators. This floating feature compensates for slight eccentricities which may be present in the packing gland assemblies 44 and seals 27, thus secondary loading conditions previously referred to are isolated. Thus the assemblies 44 and seals contained therein, also the seals 27 carried by the abutment members and rotary vanes, will not be subject to excessive wear, accordingly the life of the actuator will be materially increased.

Thus it will be seen that a rotary actuator is provided functioning to provide the various objects of the invention.

I claim:

1. In a fluid type rotary actuator, the combination comprising:
    a. a hollow housing defining an operating chamber, the inner surface thereof defining a true smooth, open-ended cylindrical surface of substantially constant diameter from end to end except for at least one longitudinal abutment member extending radially inwardly from the inner wall;
    b. a hollow shaft of cylindrical configuration rotatably disposed in said housing, defining in part a fluid distribution chamber, and including at least one longitudinal vane member extending radially outwardly from the outer surface of said shaft and defining with said abutment member an expansible chamber, said shaft having threads formed on each end;
    c. the shaft of said actuator including seals and bearing assemblies;
    d. ring nuts threadably engaging each end of said shaft securing said shaft, seals and bearing assemblies together between said nuts and shoulders formed on each end of said shaft whereby they operate as a unit;
    e. and said shaft, seals and bearing assemblies being positioned in said housing with the axis of said shaft and housing having a coinciding relation.

2. In a fluid type rotary actuator set forth in claim 1:
    a. in which the major portions of said housing are free of projections thereby rendering its wall thickness constant throughout its extent.

3. In a fluid type actuator as set forth in claim 2:
    a. in which the fluid distribution chamber extends longitudinally of said shaft and including a separation wall intermediate its ends and the diameter of said distribution chamber exceeding 50 percent of the inner diameter of the operating chamber at least 50 percent.

* * * * *